United States Patent
Zullig et al.

(10) Patent No.: US 9,051,948 B2
(45) Date of Patent: Jun. 9, 2015

(54) SLIDE PLATE FOR AN ECCENTRIC CLOSURE

(75) Inventors: Kurt Zullig, Kirchberg (CH); Marcel Strassle, Kirchberg (CH)

(73) Assignee: SYMA INTERCONTINENTAL AG, Kirchberg (CH)

( * ) Notice: Subject to any disclaimer, the term of this patent is extended or adjusted under 35 U.S.C. 154(b) by 148 days.

(21) Appl. No.: 13/825,503

(22) PCT Filed: Sep. 19, 2011

(86) PCT No.: PCT/EP2011/066222
§ 371 (c)(1),
(2), (4) Date: Mar. 21, 2013

(87) PCT Pub. No.: WO2012/038376
PCT Pub. Date: Mar. 29, 2012

(65) Prior Publication Data
US 2013/0183085 A1 Jul. 18, 2013

(30) Foreign Application Priority Data
Sep. 23, 2010 (EP) .................................... 10178912

(51) Int. Cl.
*H05K 7/14* (2006.01)
*F16B 7/04* (2006.01)

(52) U.S. Cl.
CPC .................. *F16B 7/04* (2013.01); *Y10T 403/60* (2015.01); *F16B 7/046* (2013.01)

(58) Field of Classification Search
CPC ........... F16B 7/04; F16B 7/046; F16B 7/0473
USPC .......... 403/201, 252, 255, 257, 325, 326, 329
See application file for complete search history.

(56) References Cited

U.S. PATENT DOCUMENTS

| 4,787,769 | A | * | 11/1988 | Michael | 403/252 |
| 4,815,179 | A | * | 3/1989 | Klaric | 24/606 |
| 4,974,987 | A | * | 12/1990 | Smock | 403/252 |
| 4,983,065 | A | * | 1/1991 | Spath | 403/252 |

(Continued)

FOREIGN PATENT DOCUMENTS

| CH | 693313 A5 | * | 5/2003 | ................ F16B 7/04 |
| CN | 201045366 Y | | 4/2008 | |

(Continued)

OTHER PUBLICATIONS

International Preliminary Report on Patentability issued on Apr. 4, 2013 in International Patent Application No. PCT/EP2011/055222.

(Continued)

*Primary Examiner* — Joshua Kennedy
(74) *Attorney, Agent, or Firm* — Sughrue Mion, PLLC

(57) ABSTRACT

A slide plate (20) for a cam-type closure of a clamping device (1) for releasably connecting two profiled pieces (2). The slide plate has a coupling region (11, 28) for coupling with locking elements (4, 5, 6) of the clamping device (1). The slide plate (20) has an inner opening (23) for receiving an eccentric roll (22) of the clamping device (1), which can be used for the axial displacement (30, 130) of the slide plate (20). A spring region (27) is provided between the inner opening (23) for receiving an eccentric roll (22) and the coupling region (11, 28).

6 Claims, 3 Drawing Sheets

(56) References Cited

U.S. PATENT DOCUMENTS

| | | | |
|---|---|---|---|
| 5,127,761 A * | 7/1992 | Vieler | 403/252 |
| 5,143,474 A * | 9/1992 | Vieler | 403/252 |
| 5,209,598 A * | 5/1993 | Zullig | 403/255 |
| 5,464,298 A * | 11/1995 | Schomakers | 403/252 |
| 6,106,183 A * | 8/2000 | Strassle et al. | 403/252 |
| 6,116,808 A * | 9/2000 | Strassle et al. | 403/252 |
| 6,334,732 B1 * | 1/2002 | Strassle et al. | 403/321 |
| 2006/0255225 A1 * | 11/2006 | Nicoletti | 248/316.7 |
| 2007/0157678 A1 * | 7/2007 | Jianzheng | 70/1 |
| 2008/0307617 A1 * | 12/2008 | Liu et al. | 24/572.1 |
| 2009/0010710 A1 * | 1/2009 | Offenbroich | 403/404 |
| 2010/0129143 A1 * | 5/2010 | Hackenberg et al. | 403/282 |
| 2010/0135719 A1 * | 6/2010 | Liu et al. | 403/326 |

FOREIGN PATENT DOCUMENTS

| | | |
|---|---|---|
| EP | 0 506 607 A2 | 9/1992 |
| WO | 97/20148 A1 | 6/1997 |

OTHER PUBLICATIONS

Translation of the Office Action dated Apr. 30, 2014, issued by the State Intellectual Property Office of the P.R.C. in corresponding Chinese Application No. 201180045596.1.

* cited by examiner

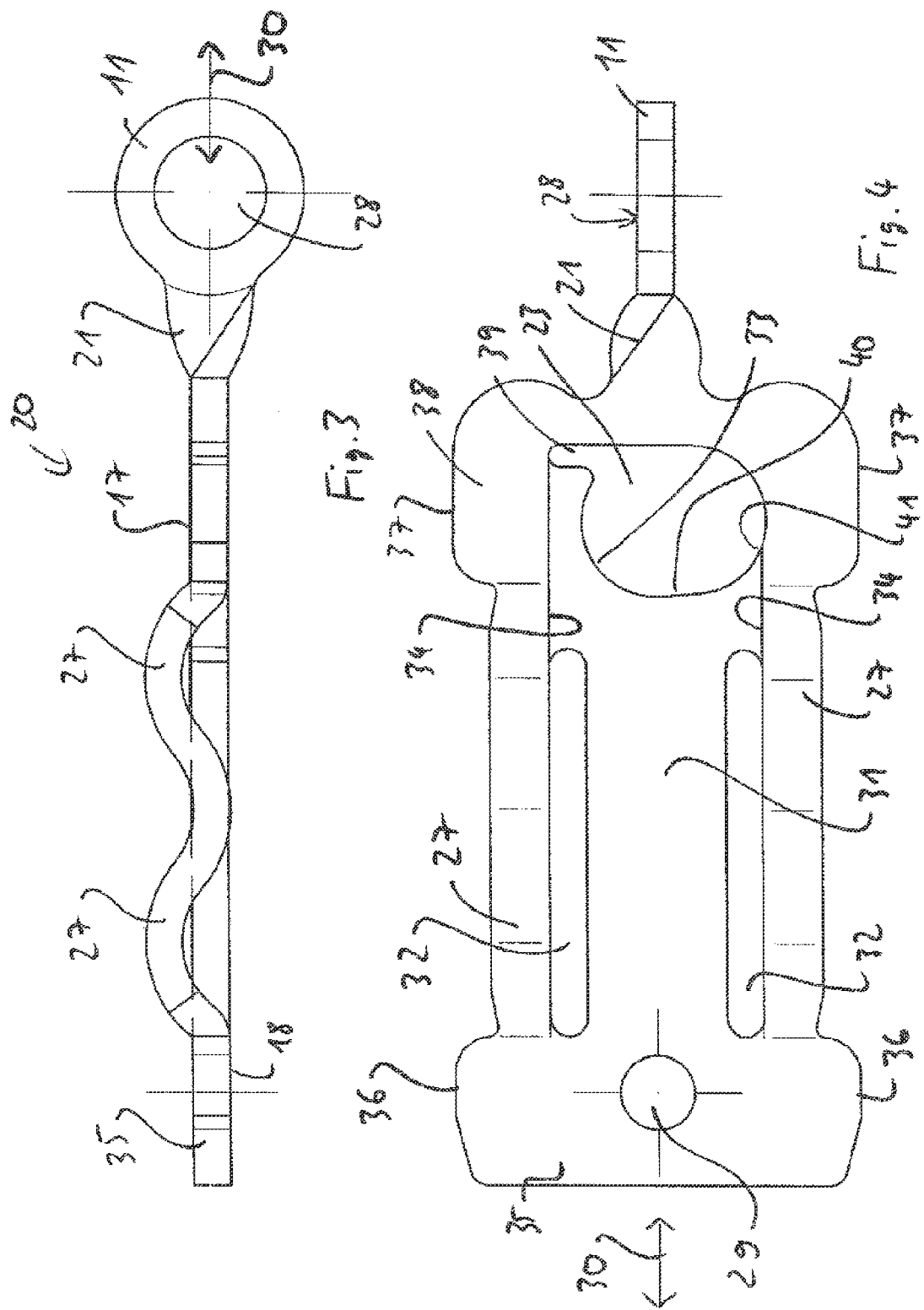

SLIDE PLATE FOR AN ECCENTRIC CLOSURE

CROSS REFERENCE TO RELATED APPLICATIONS

This application is a National Stage of International Application No. PCT/EP2011/066222 filed Sep. 19, 2011, claiming priority based on European Patent Application No. 10 178 912.1 filed Sep. 23, 2010, the contents of all of which are incorporated herein by reference in their entirety.

TECHNICAL AREA

A slide plate for an eccentric closure of a clamping device for releasably connecting two profiled pieces.

PRIOR ART

Such a slide plate is known from WO 97/20148 of the applicant. It is part of a clamping device described therein for releasably connecting two profiled pieces. An insert core of the clamping device has an axially movable slide with an end section for displacing a clamping element, which can at least partially be inserted into an opening in one of the two profiled pieces. The slide has an inner opening for receiving an eccentric roll, which is used to perform the axial displacement.

This clamping device works very satisfactorily, and exhibits no functional problems. However, it does require a precise manufacture of the eccentric roll and its bearing, along with the slide plate and its opening for receiving the eccentric roll, since rotating the eccentric roll in the opening actuates the plate, and thereby displaces the clamping element. It is here essential to apply enough of a clamping force, and that the point of maximum displacement not be completely reached or exceeded.

DESCRIPTION OF THE INVENTION

Based on this prior art, the object of the invention is to indicate a slide plate for a clamping element of the kind mentioned above, which permits a simpler clamping, and is less sensitive to production tolerances.

This object is achieved by a slide plate, wherein the slide plate is for an eccentric closure of a clamping device for releasably connecting two profiled pieces is proposed that has a coupling region for coupling with locking elements of the clamping device. The slide plate here has an inner opening for receiving an eccentric roll of the clamping device, which can be used for the axial displacement of the slide plate. A spring region is provided between the inner opening for receiving an eccentric roll and the coupling region. Resiliently actuating the eccentric roll allows the user to feel a rising resistance during actuation, so that not only do the closure element latches swivel, a haptic feedback is also provided. At the same time, a closure element provided with such a slide plate exhibits a greater tolerance for the profiled pieces to be attached to each other, and cannot be overtightened or inadvertently detached.

Because the spring region consists of a single-piece moulding of the surface of the slide plate, the part is easy to manufacture, and functionally reliable over the course of long cycles.

Advantageously provided are two lateral spring regions, which terminate in an end region of the slide plate lying opposite the coupling region. This makes it possible to provide a counter-tongue joined with the end region between the two lateral spring regions, which exhibits an inner opening, so that the edges of the inner opening are effectively exposed to the clamping force via the cam. This also makes it possible to continue providing this opening in proximity to the lug of the coupling region, thereby allowing the counter-tongue to yield a long spring deflection.

Additional embodiments are indicated in the dependent claims.

One significant advantage to the slide plate according to the invention for a clamping device is that the individual components, meaning also including in particular the profiled pieces in which the clamping devices are used, can exhibit a larger play, i.e., be fabricated with higher tolerances, without sacrificing any operational reliability.

BRIEF DESCRIPTION OF THE DRAWINGS

Preferred embodiments of the invention will be described below based on the drawings, which are intended for explanatory purposes only, and must not be construed as limiting. The drawings show:

FIG. 3 A side view of the slide plate from FIG. 1;

FIG. 4 A top view of the slide plate according to FIG. 2;

DESCRIPTION OF PREFERRED EMBODIMENTS

Figure 1:
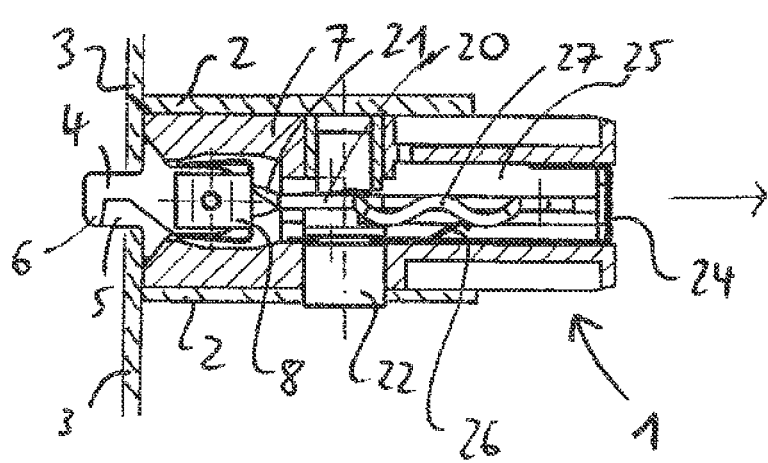
FIG. 1 A partially cut side view of a clamping device with a slide plate according to an exemplary embodiment of the invention.

FIG. 1 shows a partially cut cross sectional view of a clamping device 1 for releasably connecting two profiled pieces, of which the one profiled piece 2 is a profile that envelops an insert, and the second profiled piece 3 is a front surface 3 running transversely thereto with an opening or at least a groove running perpendicular to the plane of projection. The first profiled piece 2 is used for connection to the second profiled piece 3, which exhibits the aforesaid opening, so as to receive the latches 4, 5 of the clamping device 1 with their noses 6, which then spreads the latches 4, 5 apart to connect the two profiled pieces with each other. The latches and noses can here be equipped as described in EP 0 506 607 of the applicant, and are preferably alternately stacked with the noses 6 in the two directions, allowing them to engage the aforesaid opening from the back in the second profiled piece uniformly on both sides.

The clamping device 1 further exhibits an insert core 7, in which the latches 4 and 5 are secured in a known manner by means of a latch bolt 8.

Figure 2:
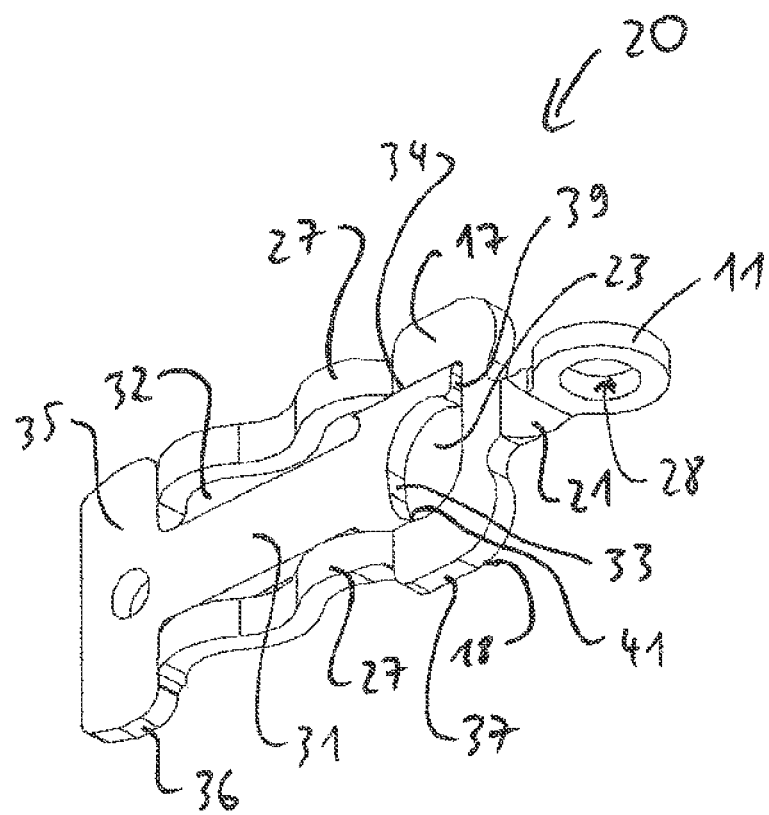
FIG. 2 A perspective view of the slide plate from FIG. 1.

The latch bolt 8 is connected with a perforated lug 11, a better view of which is provided on FIGS. 2 and 3.

The slide plate itself is marked with reference number 20 on FIG. 1, and the transitional region 21 toward the latch bolt 8 rotated by 90 degrees can be discerned in the space behind this bolt 8.

Reference number 22 marks the eccentric roll, which engages into the recess 23 depicted on FIG. 3, penetrating through the latter. The eccentric roll 22 is here laterally guided by the insert core 7, so that the slide plate 20 arranged in the insert core 7 can be displaced in its longitudinal direction by turning the eccentric roll 22. The displacement of the slide plate 20 in this longitudinal direction denoted by the arrow 130 leads to a swivelling motion by the latches 4 and 5, wherein the latch bolts 8 cause the resultantly imparted translational motion to open or close the latches 4, 5 in relation to the noses 6.

The slide plate 20 is guided in the insert core 7, wherein the translational motion is triggered in direction 130 by rotating the cam 8.

In the exemplary embodiment depicted, a spring 24 is an essentially U-shaped metal plate, which is introduced into a corresponding receiving space 25 of the clamping element 1 from the side lying opposite the latches 4 and 5. It has two advantageously blanked out lateral flexible tongues 26, which abut against corresponding stop surfaces on the guide. The continuing flexible tongue 126 is wrapped with a recess around the base of the eccentric bolt 22, so as to press in the latter for insertion into the profiled piece 2.

FIG. 2 shows a perspective view of the slide plate 20. FIG. 3 then presents a side view of the slide plate 20. The arrow 30 denotes the translational motion of the slide plate 20, and in particular of the coupling lug 11. Rotating the coupling lug 11 with the through bore 28 for receiving the latch bolt 8 by 90 degrees in the transitional region 21 is known from prior art, and represents a preferred embodiment for giving the clamping element 1 a flat design, thereby enabling its use in thin profiles joined with most often an oblong, supporting profiled piece. In other configurations, the connecting lug 11 can also lie in the same plane as the slide plate 20. A corresponding recess also does not have to be provided for a latch bolt 8. Essential here is that a coupling device 11, 28 be provided with which the latches 4 and 5 can be actuated when clamping in the direction of arrow 130, facilitated by the motion of the slide plate 20 in the direction of the double arrow 30.

The slide plate in the prior art from WO 97/20148 is made out of a solid material, with a recess 23 for receiving the latch bolt 22.

The slide plate 20 according to the present invention is also configured as a single piece, but exhibits various partial regions, advantageously generated by stamping. A counter-tongue 31 is separated by the solid material of the slide plate 20. In an advantageous, but not absolutely necessary embodiment, lateral openings 32 are here stamped out opposite the double S-shaped regions 27. The recess 23 for receiving the eccentric bolt 22 is stamped out in the direction toward the lug 11. The edges 34 are interrupted only by the material of the slide plate 20 on the two opposing sides of the counter-tongue between the counter-tongue 31 and edge walls 33 of the recess 23, but preferably contact each other, so that, when the slide plate 20 is clamped with forces stemming from the rotation of the eccentric bolt 22 in the recess 23, these forces can collectively be transmitted in a lateral direction toward the slide plate 20.

The counter-tongue 31 terminates on the side lying opposite the lug 11 in an end region 35, most advantageously with a broad configuration. The lateral surfaces 36 of this end region 35 in conjunction with the end surfaces 37 of the front plate region 38 can be guided laterally in the insert core 7, and if necessary also on their surfaces, the upper side 17 and the lower side 18. In other words, the insert core 7 incorporates a hollow space for receiving the slide plate 20, which exhibits a lateral expansion with the size of the distance separating the lateral edges 36 and 37.

In the exemplary embodiment shown, a suspension hole 29 is provided as an option in the end region 35, so that the slide plate can be hung up after a finishing step, for example curing or tempering.

As already suggested above, respective double S-shaped spring regions 27 exist on both sides of the counter-tongue 31. Double S-shape means that material is guided out of the principal plane of the slide plate 20 in the manufacturing process through moulding. The two double S-shapes are preferably moulded in the same direction relative to the principal plane of the slide plate 20. However, they can also be extruded in opposite directions.

When manufacturing the spring plate originally stamped out as a single piece, care is taken in generating the lateral regions 32 and the recess 23 while separating the counter-tongue 31 on the surfaces 34 to also provide a stamped opening 39 on the side facing the end region 38 for the lug to go along with the opening 23 that accommodates the eccentric roll 22. This opening first generated in the original stamping step is then even larger in terms of longitudinal dimensions, and becomes shortened by the formation of the double S-spring elements 27, since the latter cause the counter-tongue 31 to move toward the lug 11 in relation thereto.

The recess 23 has a curvature 33 provided with a predetermined radius, a flat region 40 and an opposing curvature with the same predetermined radius, in which the point 41 is referred to as the transitional region. It must here be remembered that the radius there passes from one portion of the counter-tongue 31 to a portion of region 38. The eccentric roll 22 has a diameter of the eccentric roll receptacle 122. The shape of the eccentric roll 22 is readily discernible on FIG. 5.

The improved function of this slide plate 20 by comparison to prior art stems from the fact that, when the eccentric roll 22 is inserted and turned, it abuts against the wall 40 and in particular consists of a spring 26 that presses the slide plate 20 away in the direction of the end region 35 in relation to the arrow 30. However, the lug 11 is joined with the insert core in the latch bolt 8 in a translationally rigid manner, so that the only transmitted translational motion causes the latches 4 and 5 to move to the back, and the noses 6 to spread with respect to the second profile (not shown). Upon attainment of maximum spreading, which naturally also depends on the depth of the back-cut opening in the second profiled piece, continuing to turn the eccentric bolt 22 in the opening does not yield any more translational motion in prior art, but rather causes the slide plate to become clamped with respect to the eccentric roll 22 located in the insert core 8.

In the present invention, continuing to turn the eccentric roll 22 causes the counter-tongue 31 to be pressed away further in the direction of the end region 35. This is possible, since the two lateral spring regions 27 with their double S-configuration exhibit a certain inherent, predefined spring deflection, and can be stretched by the arising forces. In other words, the counter-tongue 31 moves relative to the front region 38 of the slide plate, in a translational manner, as evident in particular from the separation planes 34.

As may be gleaned from the above, while the selected double S-shape of the elements 27 does ensure an advantageous spring deflection, there could also be a simple S-shape or some other configuration made of a solid material that permits a spring deflection. The "S" could also itself be provided beyond the principal plane of the slide plate 20, and extend on both sides of this principal plane.

In particular the spring deflection generated by the lateral elements 27 can ensure that the user feels an increasing resistance with such a clamping element 1 configured with the slide plate 20, which starts when first tightening the latches 4, 5 before spreading the noses 6, and makes the tightening and locking of the clamping element 1 for joining the two profiled pieces haptically tangible. In addition, the increasing exposure of the slide plate 20 to a force exerted by the eccentric bolt 22 ensures it remains immovably in place during the clamping process, and does not slide back into an initial position.

The slide plate is advantageously made out of spring steel.

Figure 5:
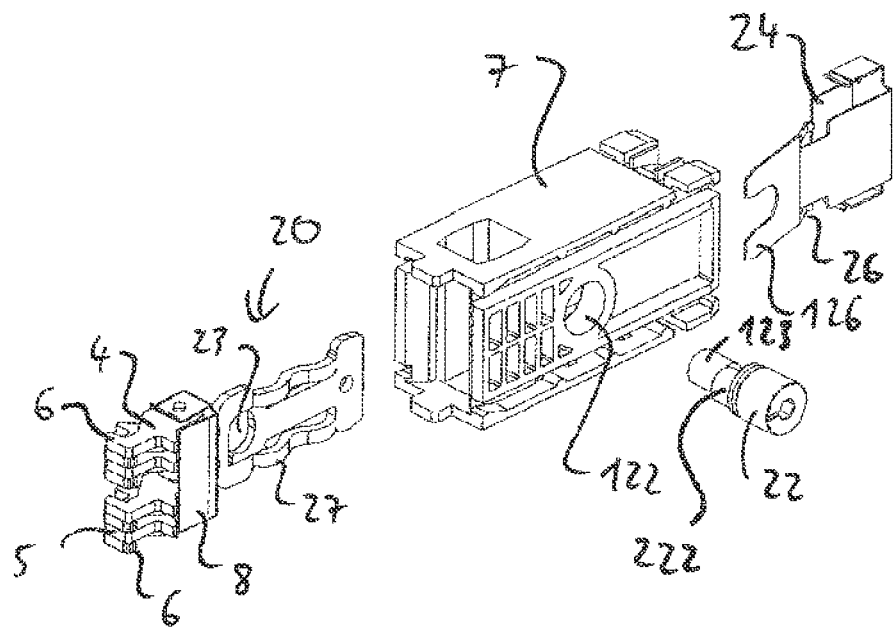
FIG. 5 An exploded view of the clamping device according to FIG. 1.

FIG. 5 presents an exploded view of the clamping device according to FIG. 1, wherein only the essential elements better visible in relation to FIGS. 1 to 4 are described and labelled. The eccentric roll 22 along with the eccentric counter bearing 123 is pushed through and into the cam receptacle 122 in the insert core 7, wherein the cam 222 abuts against the spring region existing around the U-shaped opening of the flexible tongue 126 of the spring 24, so that it can be inserted and released. Critical here is that the cam 222 be pushed through the opening 23 and into the slide plate 20, and be able to rotate in the latter.

| REFERENCE LIST | |
|---|---|
| 1 | Clamping element |
| 2 | First profile |
| 3 | Second profile |
| 4 | Latch |
| 5 | Latch |
| 6 | Nose |
| 7 | Insert core |
| 8 | Latch bolt |
| 11 | Lug |
| 17 | Upper side |
| 18 | Lower side |
| 20 | Slide plate |
| 21 | Transitional region |
| 22 | Eccentric roll |
| 23 | Recess |
| 24 | Spring |
| 25 | Opening |
| 26 | Flexible tongue |
| 27 | Double S-spring region |
| 28 | Latch bolt opening |
| 29 | Suspension hole |
| 30 | Double arrow |
| 31 | Counter-tongue |
| 32 | Stamped out area |
| 33 | Inner edge |
| 34 | Lateral edges |
| 35 | End region |
| 36 | Lateral edge |
| 37 | Lateral edge |
| 38 | Front region |
| 39 | Stamped opening |
| 40 | Edge surface |
| 41 | Transitional region |
| 122 | Eccentric roll receptacle |
| 123 | Eccentric counter bearing |
| 126 | Flexible tongue section |
| 130 | Clamping direction |
| 222 | Cam |

The invention claimed is:

1. A slide plate for an eccentric closure of a clamping device having locking elements for releasably connecting two profiled pieces through actuating an eccentric roll for an axial displacement of the slide plate, wherein the slide plate comprises:
a coupling region for coupling with the locking elements of the clamping device, wherein the slide plate has
an inner opening for receiving the eccentric roll of the clamping device, which can be used for the axial displacement of the slide plate,
wherein a spring region is provided between the inner opening for receiving the eccentric roll and the coupling region,
wherein the spring region consists of a single-piece moulding of the surface of the slide plate and comprises two lateral spring regions, which terminate in an end region of the slide plate lying opposite the coupling region, and
wherein a counter-tongue joined with the end region is provided between the two lateral spring regions and adjoined by the inner opening.

2. The slide plate according to claim 1, wherein a free end of the counter tongue laterally abuts a front region of the slide plate, which is provided between the coupling region and the two lateral spring regions.

3. The slide plate according to claim 1, wherein the inner opening has an engaging edge for the eccentric roll that runs transverse relative to the spring regions.

4. The slide plate according to claim 1, further exhibiting lateral guide edges in the direction of the axial displacement.

5. The slide plate according to claim 1, wherein the spring regions exhibit one of the group of single or double S-shape in the cross section of the slide plate, which extend out of the plane of the slide plate toward one side.

6. The slide plate according to claim 1, wherein the spring regions exhibit one of the group of single or double S-shape in the cross section of the slide plate, which extend out of the plane of the slide plate toward both sides.

* * * * *